United States Patent
Kawano et al.

(10) Patent No.: US 11,365,985 B2
(45) Date of Patent: Jun. 21, 2022

(54) ROTATION DETECTION DEVICE

(71) Applicant: Mitsubishi Electric Corporation, Tokyo (JP)

(72) Inventors: Yu Kawano, Tokyo (JP); Satoshi Iohara, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 122 days.

(21) Appl. No.: 16/649,286

(22) PCT Filed: Nov. 17, 2017

(86) PCT No.: PCT/JP2017/041547
§ 371 (c)(1),
(2) Date: Mar. 20, 2020

(87) PCT Pub. No.: WO2019/097692
PCT Pub. Date: May 23, 2019

(65) Prior Publication Data
US 2020/0284614 A1  Sep. 10, 2020

(51) Int. Cl.
*G01D 5/14* (2006.01)
*H02K 11/215* (2016.01)
(Continued)

(52) U.S. Cl.
CPC .............. *G01D 5/14* (2013.01); *B60R 16/033* (2013.01); *H02K 11/215* (2016.01); *H02K 24/00* (2013.01)

(58) Field of Classification Search
CPC .......... G01D 5/14; B62D 5/046; B62D 5/049; B62D 15/021; B62D 15/0235;
(Continued)

(56) References Cited

U.S. PATENT DOCUMENTS 6,675,124 B2    1/2004 Koga
2013/0314015 A1* 11/2013 Hoshi ................ H02P 6/10
                                          318/400.23
(Continued)

FOREIGN PATENT DOCUMENTS

DE    102011 121 411 A1    6/2013
DE    10 2012 103 092 A1   10/2013
(Continued)

OTHER PUBLICATIONS

Communication dated Oct. 23, 2020 by the European Patent Office in the application No. 17932263.1.
(Continued)

*Primary Examiner* — Huy Q Phan
*Assistant Examiner* — Dustin R Dickinson
(74) *Attorney, Agent, or Firm* — Sughrue Mion, PLLC; Richard C. Turner

(57) ABSTRACT

Provided is a rotation detection device including: a power supply unit configured to output constant power supply; a rotation sensor unit configured to output a detection signal that depends on rotation of a vehicle; a controller configured to calculate on-time rotation information on the vehicle, which is information at a time when an ignition switch is on, to control a motor; and a calculation unit configured to calculate off-time rotation information on the vehicle by intermittently supplying a power supply voltage to the rotation sensor unit when the ignition switch is off, update a set value of an intermittent interval so that the set value becomes smaller when the off-time rotation information contains information indicating rotation of a motor for the vehicle, and otherwise update the set value of the intermittent interval so that the set value becomes larger.

7 Claims, 6 Drawing Sheets

(51) Int. Cl.
*B60R 16/033* (2006.01)
*H02K 24/00* (2006.01)

(58) Field of Classification Search
CPC ...... H02K 24/00; H02K 11/21; H02K 11/215; B60R 16/033; B60R 16/03; H02P 2203/05; H02P 6/16
See application file for complete search history.

(56) References Cited

U.S. PATENT DOCUMENTS

| | | | |
|---|---|---|---|
| 2014/0158455 A1* | 6/2014 | Takaki | G01B 7/30 180/446 |
| 2015/0239501 A1 | 8/2015 | Fujita et al. | |
| 2016/0231142 A1* | 8/2016 | Kawano | B62D 5/046 |
| 2017/0241805 A1* | 8/2017 | Ferri | G04C 3/004 |
| 2018/0234039 A1* | 8/2018 | Kuwahara | B62D 5/0463 |
| 2018/0237068 A1* | 8/2018 | Yoo | B60W 10/20 |

FOREIGN PATENT DOCUMENTS

| | | |
|---|---|---|
| DE | 10 2013 104 586 A1 | 11/2014 |
| EP | 2 037 221 A2 | 3/2009 |
| EP | 2 050 658 A1 | 4/2009 |
| EP | 2 037 221 A3 | 11/2010 |
| EP | 2 309 230 A1 | 4/2011 |
| EP | 2 450 266 A1 | 5/2012 |
| ER | 3 422 563 A1 | 1/2019 |
| JP | 2004-239737 A | 8/2004 |
| JP | 2012-103089 A | 5/2012 |
| JP | 5958572 B2 | 8/2016 |
| WO | 2010069974 A1 | 6/2010 |
| WO | 2014/148087 A1 | 9/2014 |
| WO | 2016135923 A1 | 9/2016 |

OTHER PUBLICATIONS

International Search Report for PCT/JP2017/041547 dated Jan. 16, 2018 [PCT/ISA/210].

* cited by examiner

ROTATION DETECTION DEVICE

CROSS REFERENCE TO RELATED APPLICATIONS

This application is a National Stage of International Application No. PCT/JP2017/041547 filed Nov. 17, 2017.

TECHNICAL FIELD

The present invention relates to a device configured to detect rotation in a vehicle, and more particularly, to a rotation detection device configured to detect rotation even when an ignition switch is off.

BACKGROUND ART

In a related-art electric power steering device, a system for driving an electric motor is used to rotate a steering wheel and a wheel. In such a system, when an ignition switch (power supply switch) is on, the electric motor is driven to give assistance to a steering force. Further, a rotation angle of a rotation axis of the electric motor or a detection value of a rotation speed of the electric motor has been used for control of drive of the motor.

Further, even when the ignition switch is off, a driver may operate the steering wheel, or the steering wheel may be rotated forcibly during repair of the vehicle. Through detection of rotation in such a case, it is possible to start control smoothly when an engine is started again (e.g., refer to Patent Literature 1).

CITATION LIST

Patent Literature

[PTL 1] JP 5958572 B2

SUMMARY OF INVENTION

Technical Problem

However, the related art has the following problem.

A related-art device disclosed in Patent Literature 1 is configured to calculate first rotation information normally when an ignition switch is on, and calculate second rotation information when the ignition switch is off, so as to enable transmission of calculation results to a controller. Further, the related-art device reduces a current consumed when the ignition switch is off by setting a difference between resolutions of detection results, for example, by setting the first rotation information and the second rotation information as a rotation angle and the number of rotations, respectively.

In other words, such a related-art device is required to include a circuit having two types of resolutions in a rotation detection unit. Further, a device for acquiring the second rotation information is directly connected to a battery, and thus even when the device is not required to be used, that is, even when the device is not rotating at all, power is supplied to that device. Therefore, there is still room for improvement in order to reduce a dark current, which is a current flowing when the ignition switch is off, to reduce current consumption.

The present invention has been made to solve the above-mentioned problem, and has an object to provide a rotation detection device capable of reducing current consumption required for detecting rotation information while at the same time detecting the rotation information even when an ignition switch is off.

Solution to Problem

According to one embodiment of the present invention, there is provided a rotation detection device including: a power supply unit, which is connected to a battery mounted on a vehicle and to an ignition switch, and is configured to output constant power supply; a rotation sensor unit configured to output a detection signal corresponding to rotation information that depends on a rotation operation of a vehicle, by using a power supply voltage supplied from the power supply unit; and a controller configured to calculate on-time rotation information on the vehicle, which is information at a time when the ignition switch is on, by using a detection signal output from the rotation sensor unit, to control a motor for the vehicle, wherein the rotation detection device further includes a calculation unit configured to: control the power supply unit to intermittently supply the power supply voltage to the rotation sensor unit when the ignition switch is off; intermittently supply the power supply voltage to calculate off-time rotation information on the vehicle by using a detection signal output from the rotation sensor unit; update a set value of an intermittent interval, at which the power supply voltage is to be supplied intermittently, so that the set value becomes smaller, when the off-time rotation information contains information indicating rotation of the motor for the vehicle; update the set value of the intermittent interval, at which the power supply voltage is to be supplied intermittently, so that the set value becomes larger, when the off-time rotation information on the vehicle, which is calculated when the ignition switch is off, does not contain the information indicating rotation of the motor for the vehicle; and store the off-time rotation information into a storage unit, and wherein the calculation unit is configured to transfer the off-time rotation information stored in the storage unit to the controller when the ignition switch is set on again.

Advantageous Effects of Invention

According to the present invention, the sensor configured to detect rotation has a configuration of supplying a voltage intermittently when the ignition switch is off. As a result, it is possible to provide the rotation detection device capable of reducing current consumption required for detecting rotation information while at the same time detecting the rotation information even when the ignition switch is off.

DESCRIPTION OF EMBODIMENTS

A rotation detection device according to preferred embodiments of the present invention is described below with reference to the accompanying drawings.

First Embodiment

Figure 1:
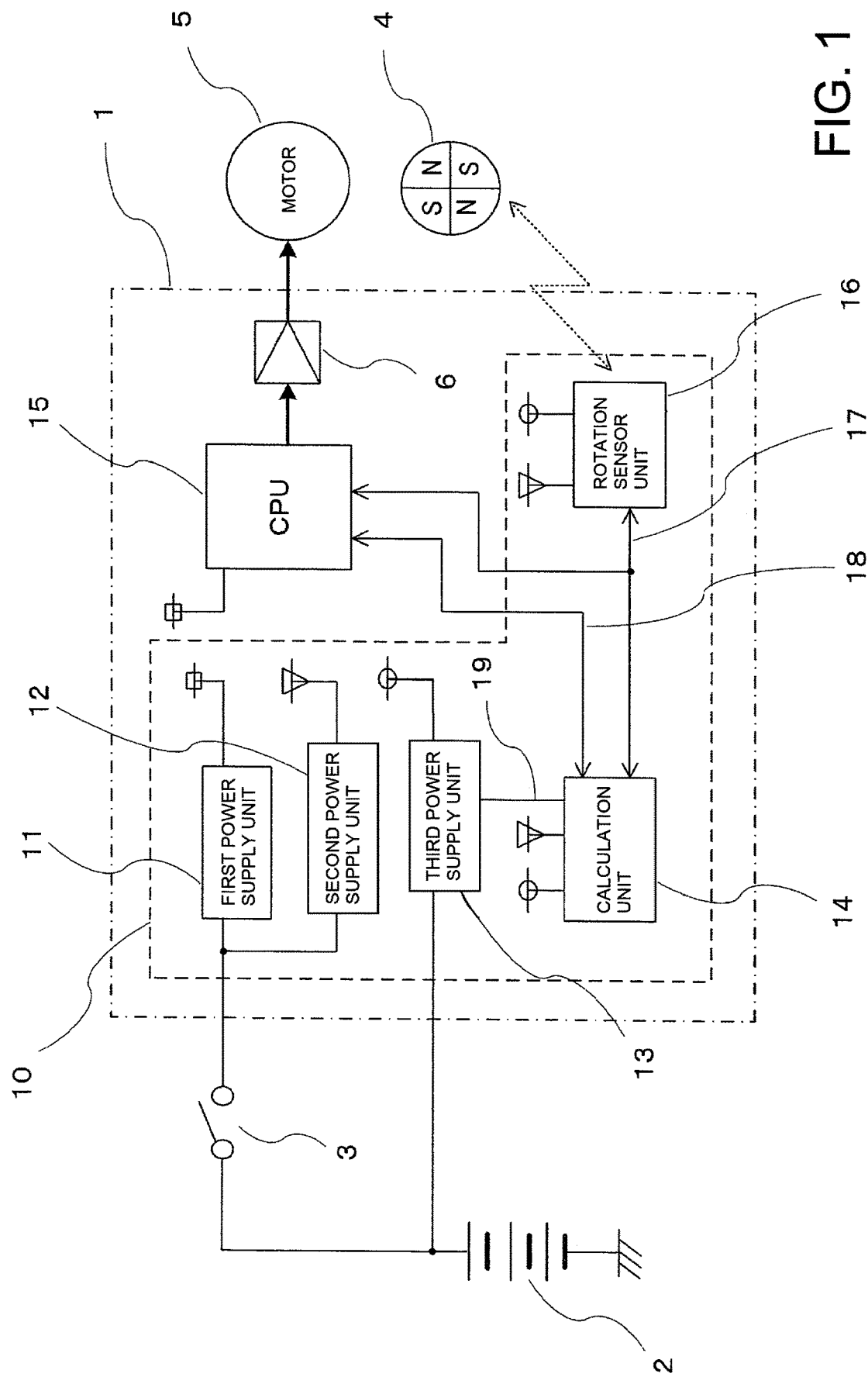
FIG. 1 is a circuit diagram for illustrating an entire system including a rotation detection device according to a first embodiment of the present invention.

FIG. 1 is a circuit diagram for illustrating an entire system including a rotation detection device according to a first embodiment of the present invention. The system illustrated in FIG. 1 can also be used for an electric power steering device, for example.

The system illustrated in FIG. 1 includes a control unit 1, a battery 2, an ignition switch 3, and a motor 5. The motor 5 is, for example, a motor configured to give assistance to a steering wheel. The control unit 1 includes a CPU 15 configured to calculate and output a control amount, a drive circuit 6 configured to drive the motor 5 in accordance with a command output by the CPU 15, and a rotation detection circuit 10. The CPU 15 herein corresponds to a controller.

A rotor 4 formed of a permanent magnet mounted to an output shaft of the rotating motor 5 is installed outside of the rotation detection circuit 10. In order to detect rotation of this permanent magnet, a rotation sensor unit 16 inside the rotation detection circuit 10 is arranged near the rotor 4. The steering wheel, tires, or the like may be rotated forcibly even when the ignition switch 3 is off, which influences an offset value or a learned value of a rotation position, for example. Thus, it is important to detect rotation of the steering wheel, tires, or the like as information required immediately after the engine is started again even when the ignition switch 3 is off.

The rotation detection circuit 10 has incorporated therein a calculation unit 14 and the rotation sensor unit 16 as well as three power supplies, namely, a first power supply unit 11, a second power supply unit 12, and a third power supply unit 13. The third power supply unit 13 is directly connected to the battery 2. Meanwhile, the first power supply unit 11 and the second power supply unit 12 are connected to the battery 2 via the ignition switch 3.

The third power supply unit 13 is directly connected to the battery 2, and thus power is supplied from the battery 2 to the third power supply unit 13 irrespective of whether the ignition switch 3 is on or off. The third power supply unit 13 is, for example, a constant power supply of 3.5 V, and the output of the third power supply unit 13 is supplied to the rotation sensor unit 16 as indicated by the symbol "○" in FIG. 1.

Meanwhile, both of the first power supply unit 11 and the second power supply unit 12 are constant power supplies of 5 V. The output of the first power supply unit 11 is connected to the CPU 15 and other components as indicated by the symbol "□" in FIG. 1. The output of the second power supply unit 12 is connected to the rotation sensor unit 16 as indicated by the symbol "∇". When the outputs of the first power supply unit 11 and the second power supply unit 12 are the same voltage, those power supply units may be integrated into one constant power supply.

The rotation sensor unit 16 is connected to two power supplies of a power supply of 5 V from the second power supply unit 12 and a power supply of 3.5 V from the third power supply unit. Further, the calculation unit 14 is connected to the rotation sensor unit 16. Specifically, the calculation unit 14 receives rotation information from the rotation sensor unit 16 via a communication line 17, and transmits a command to the rotation sensor unit 16. Further, the calculation unit 14 also includes a memory (not shown) for storing calculated data. Then, the calculation unit 14 is connected to the CPU 15 via a communication line 18, and is configured to communicate information to/from the CPU 15.

Now, a description is given of a method of detecting rotation in the device configured as described above. When the ignition switch 3 is on, the CPU 15 and the rotation sensor unit 16 are supplied with 5 V from the first power supply unit 11 and the second power supply unit 12, respectively. The rotation sensor unit 16 detects a change in magnetic field due to rotation of the rotor 4. A hall sensor, an MR sensor, or the like is used as the rotation sensor unit 16, for example.

When the ignition switch 3 is on, the rotation sensor unit 16 is supplied with power of 5 V from the second power supply unit 12, and thus detailed information can be output. This detailed information is transferred to the CPU 15 via the calculation unit 14. This detailed information can also be acquired directly by the CPU 15.

When the rotation sensor unit 16 outputs both sine and cosine waveforms, for example, the calculation unit 14 can calculate the rotation angle based on signals of both waveforms. Further, the calculation unit 14 can also calculate the rotation speed based on the rotation angle. Although the calculation unit 14 can calculate the rotation angle and the rotation speed, the CPU 15 may directly calculate the rotation angle and the rotation speed.

However, there is a risk that the remaining amount of the battery 2 runs out unless the dark current is reduced as much as possible when the ignition switch 3 is off. In view of this, the dark current is reduced by cutting off power supply to the first power supply unit 11, the second power supply unit 12, the CPU 15, and the like. Further, the dark current can be reduced more when power is supplied to, for example, the CPU 15 only when the rotor 4 is rotated, and the information can be detected or stored.

The power supply of 3.5 V of the third power supply unit 13 connected to the rotor 4 is directly connected to the battery 2. The dark current can be reduced to an extremely small level by avoiding supplying power when a load connected to the power supply of 3.5V does not operate. The rotation sensor unit 16 and the calculation unit 14 are connected as loads of the third power supply unit 13. The calculation unit 14 consumes little current during a period in which the rotation sensor unit 16 does not acquire detection information. Further, when a volatile memory or a non-volatile memory is used as the memory, the dark current can be reduced to an extremely small level irrespective of the amount of information detected during a storage period.

However, when the ignition switch 3 is off, the time when the rotor 4 rotates is not known. Meanwhile, power of the third power supply unit 13 is required to be supplied to the rotation sensor unit 16 quickly at all times. Thus, in the first embodiment, in order to suppress power consumption, the configuration of supplying power to the rotation sensor unit 16 intermittently when the ignition switch 3 is off is adopted.

The intermittent interval is determined by what detection information based on the rotation sensor unit 16 is required by the device. For example, when the rotation angle is not required, and only the number of rotations is required as the detection information, the calculation unit 14 supplies power to the rotation sensor unit 16 every several seconds to check whether rotation is detected.

The calculation unit 14 sets the intermittent interval. When the rotation of the rotor 4 is detected under a state in which power of 3.5 V is supplied from the third power supply unit 13 to the rotation sensor unit 16, the calculation unit 14 acquires detection information via the communication line 17, and stores the detection information into a storage unit. In this manner, the sensor is likely to receive input again under a state in which the detection information is acquired.

In view of the above, the calculation unit 14 causes the rotation sensor unit 16 to operate so as to reliably detect the number of rotations by reducing an interval of power supply or by continuously supplying power for a certain period of time. Thus, the third power supply unit 13 and the calculation unit 14 are connected to each other via a line 19, and the calculation unit 14 controls via the line 19 an interval of power supply by the third power supply unit 13 to be variable.

Meanwhile, the rotation sensor unit 16 may be a single sensor, but it is assumed that the rotation sensor unit 16 includes a circuit configured to change output of detection information based on a difference of a constant power supply supplied thereto. That is, the rotation sensor unit 16 transmits detailed data when 5 V is supplied from the second power supply unit 12. Meanwhile, when 3.5 V is supplied from the third power supply unit 13, the rotation sensor unit 16 operates not to transmit detailed detection information, but to transmit detection information being simplified data or intermittent data.

There may be adopted a configuration in which the rotation sensor unit 16 outputs continuous waveforms in accordance with the power supply voltage, and the calculation unit 14 sets the degree of resolutions of the detection information based on the reading interval. In general, as the power supply voltage becomes lower, the current consumption tends to be smaller. Thus, it is desired to change, for example, the accuracy of detection information, the resolution, and the number of rotations depending on whether the ignition switch 3 is on or off.

After the ignition switch 3 is set off, when the ignition switch 3 is set on again, the first power supply unit 11 and the second power supply unit 12 start to supply power. Thus, the CPU 15 starts an operation, and requires the calculation unit 14 for data on the number of rotations, which is stored when the ignition switch 3 is off. The calculation unit 14 transmits the required data on the number of rotations to the CPU 15 via the communication line 18. As a result, the CPU 15 can grasp the situation of rotation during a period in which the ignition switch 3 is off at the time of starting an operation, and can reflect the situation in start of control.

Although the calculation unit 14 is supplied with power from both of the second power supply unit 12 and the third power supply unit 13, the CPU 15 is not supplied with power from the second power supply unit 12. Thus, there is a risk that, when a difference between the output voltage of the second power supply unit 12 and the third power supply unit 13 and the output voltage of the first power supply unit 11 occurs, a detection error between the CPU 15 and the calculation unit 14 occurs.

As a countermeasure for this risk, it is possible to suppress the error by supplying power to the CPU 15 with the output voltage of the second power supply unit 12 serving as a reference when the ignition switch 3 is on. Further, the first power supply unit 11 can also be arranged outside of the rotation detection circuit 10 and at a position inside the control unit 1.

As described above, in the first embodiment, there is provided the configuration of enabling, when the ignition switch is off, the rotation sensor unit 16 to be supplied with power in a different mode from a constant power supply that is different from a constant power supply used when the ignition switch is on. Specifically, in a case where a mode of supplying, when the ignition switch is off, a lower voltage than a voltage used when the ignition switch is on is adopted, current consumption required for acquiring detection information from the rotation sensor unit 16 when the ignition switch is off can be reduced.

Further, when a mode of intermittently supplying power when the ignition switch is off is adopted, the dark current can be reduced. Further, in a case where rotation is detected under a state in which power is intermittently supplied when the ignition switch is off, the intermittent interval can be changed to be smaller. Thus, it is also possible to prevent a failure to detect rotation. The mode of changing the power supply voltage and the mode of changing the intermittent interval described above both change the resolution detected by the rotation sensor unit.

Further, the device according to the first embodiment has integrated three power supply units into one power supply circuit. As a result, there is also an advantage of enabling consideration of commonalization, common use, or the like of components at the time of actual circuit design. Therefore, it is possible to implement the rotation detection device capable of reducing current consumption required for detecting rotation information as much as possible while at the same time detecting the rotation information even when the ignition switch is off.

Second Embodiment

In the configuration illustrated in FIG. 1 of the first embodiment, only the third power supply unit 13 connected to the battery 2 operates when the ignition switch is off. Further, in the configuration of FIG. 1, power is not required to be supplied to the rotation sensor unit 16 unless the rotor 4 rotates. In view of the above, in a second embodiment of the present invention, a description is given of a rotation detection device having a power supply configuration different from that of the first embodiment.

Figure 2:
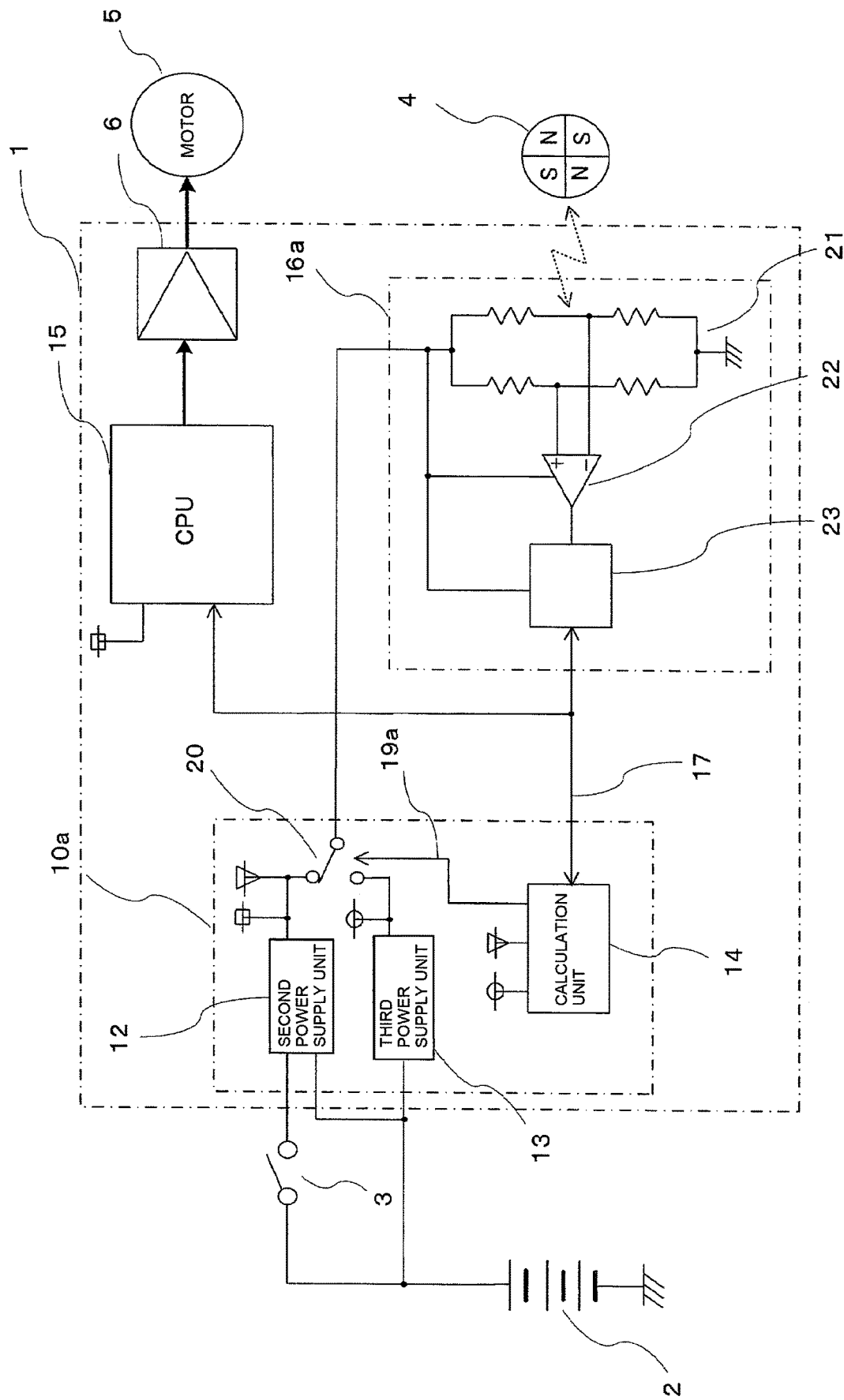
FIG. 2 is a circuit diagram for illustrating an entire system including a rotation detection device according to a second embodiment of the present invention.

FIG. 2 is a circuit diagram for illustrating an entire system including a rotation detection device according to the second embodiment of the present invention. In FIG. 2, components equivalent to those of FIG. 1 of the first embodiment are denoted by the same reference symbols. The system illustrated in FIG. 2 includes the control unit 1, the battery 2, the ignition switch 3, and the motor 5. FIG. 2 is different from FIG. 1 of the first embodiment in the configuration of the control unit 1.

In the configuration illustrated in FIG. 2, the second power supply unit 12 is supplied with power also from the battery 2. Further, in the configuration of FIG. 2, the first power supply unit 11 and the second power supply unit 12 in the configuration of FIG. 1 are integrated into the second power supply unit 12. With such a configuration, the CPU 15 is supplied with power from the second power supply unit 12 even after the ignition switch 3 is set off.

Further, similarly to the configuration of FIG. 1, the first power supply unit 11 and the second power supply unit 12 may be divided also in the configuration of FIG. 2. In that case, when the ignition switch is on, the first power supply unit 11 supplies power to the CPU 15, and the second power supply unit 12 supplies power to the sensor.

In view of the above, when the CPU 15 detects the fact that the ignition switch 3 is set off, the CPU 15 activates the third power supply unit 13, and the calculation unit 14 also recognizes this activation. After that, the CPU 15 stops power supply to the second power supply unit 12 directly connected to the battery 2, and the CPU 15 itself deactivates itself.

Meanwhile, the third power supply unit 13 and the calculation unit 14 are already activated. Thus, while the ignition switch 3 is off, the calculation unit 14 supplies power from the third power supply unit 13 to a rotation sensor unit 16a at an interval set in advance, and checks whether the rotor 4 is rotating. When the rotation is detected, the calculation unit 14 shortens an interval of power supply or continuously supplies power for a while. Further, when the rotation is no longer detected, the calculation unit 14 gradually increases the interval of power supply to return to the original state.

Now, a description is given of a specific configuration illustrated in FIG. 2 of a more detailed rotation detection method in the second embodiment. A rotation detection circuit 10a includes two types of power supply units for the rotation sensor unit 16a, namely, the second power supply unit 12 and the third power supply unit 13, and is configured to supply different voltages of 5 V and 3.5 V to the second power supply unit 12 and the third power supply unit 13, respectively.

The second power supply unit 12 includes both of a path connected to the battery 2 via the ignition switch 3 and a path directly connected to the battery 2. Meanwhile, the third power supply unit 13 is directly connected to the battery 2.

The calculation unit 14 is configured to control, via a control command line 19a, a selector 20 configured to select and output a constant power supply unit of any one of the second power supply unit 12 and the third power supply unit 13. The calculation unit 14 connects the selector 20 to the second power supply unit 12 when the ignition switch 3 is off and is not driven intermittently. Meanwhile, the calculation unit 14 connects the selector 20 to the third power supply unit 13 only while the ignition switch 3 is off and is driven intermittently.

As described above, the voltage of 5 V is output from the second power supply unit 12 until the CPU 15 confirms the fact that the ignition switch 3 is set off. Then, the CPU 15 activates the third power supply unit 13 after confirming the fact that the ignition switch 3 is set off. Further, the calculation unit 14 sets off the constant power supply of the second power supply unit 12 after the third power supply unit 13 is activated.

The rotation sensor unit 16a illustrated in FIG. 2 includes a sensor unit 21, an amplifier 22, and a communicator 23. In the second embodiment, the sensor unit 21 includes, for example, a bridge circuit formed of four variable resistors, and the resistance value of each of those variable resistors is changed depending on the magnetic field of the rotor 4.

The amplifier 22 is configured to receive input of voltages of left and right center points of the bridge circuit 21, and amplify a difference between those voltages. The communicator 23 is configured to communicate data to/from the calculation unit 14 to output a signal of the rotation sensor, or receive a command from the calculation unit 14.

The amplifier 22 and the communicator 23 are configured to operate by a power supply voltage equivalent to that of the bridge circuit 21. Thus, the resolution of the rotation sensor unit 16a in a case where 5 V is supplied when the ignition switch is on and the resolution of the rotation sensor unit 16a in a case where 3.5 V is supplied when the ignition switch is off are different from each other.

Figure 3:
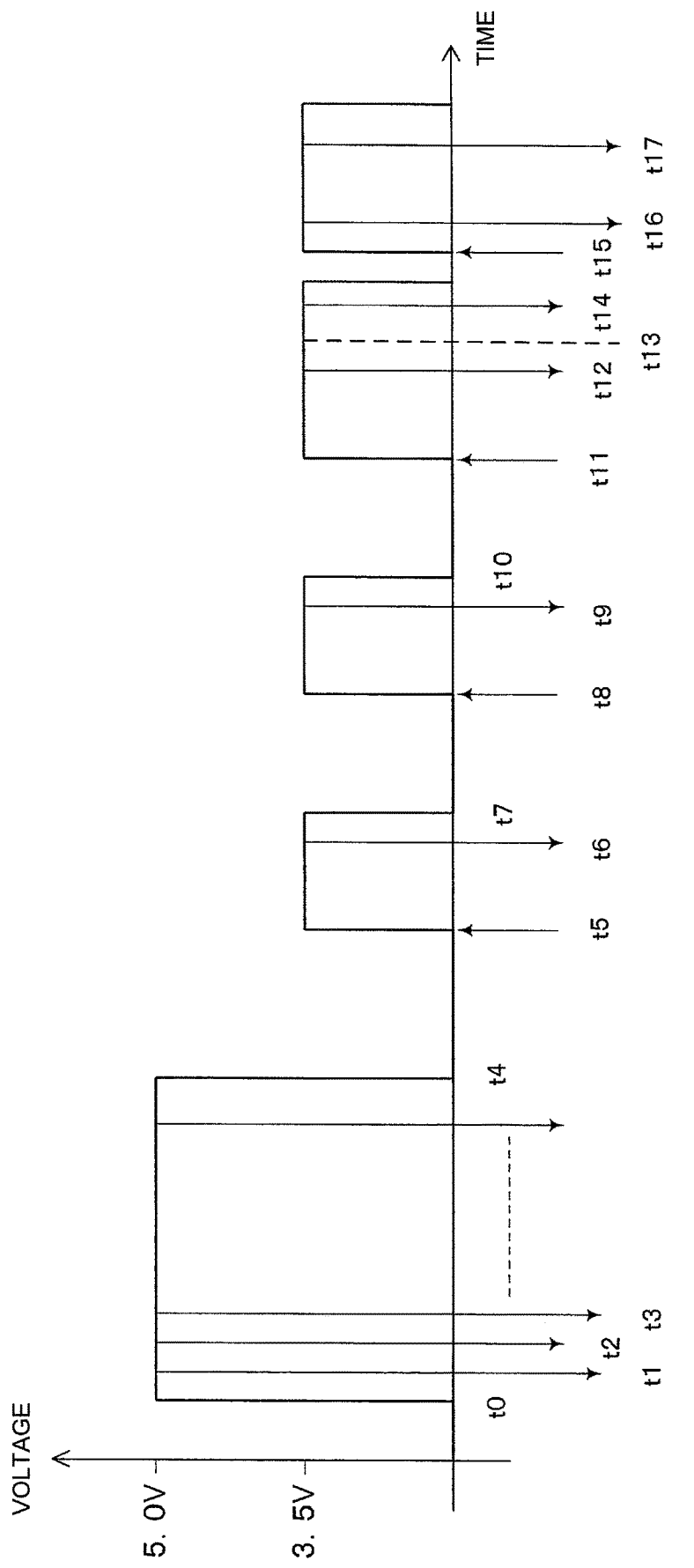
FIG. 3 is a graph for showing a situation of data communication between a rotation sensor unit and a calculation unit in the second embodiment of the present invention.

FIG. 3 is a graph for showing a situation of data communication between the rotation sensor unit 16a and the calculation unit 14 in the second embodiment of the present invention. The horizontal axis represents time, and the vertical axis represents the magnitude of the voltage of each piece of data. It is assumed that the ignition switch 3 is set on and is supplied with power of 5 V at a time point of t0.

When the ignition switch 3 is set on and the second power supply unit 12 of FIG. 2 is thus turned on, the calculation unit 14 acquires data from the rotation sensor unit 16a at time points t1, t2, and t3 set in advance as short intervals. With this, the calculation unit 14 can sequentially acquire the detection value of the bridge circuit 21, and grasp the rotation angle in detail.

The ignition switch 3 is set off at a time point of t4 to cause the calculation unit 14 to switch to supply power intermittently to the rotation sensor unit 16a. Specifically, at a time point of t5, at which a certain period of time has elapsed since the time point of t4, the calculation unit 14 supplies the rotation sensor unit 16a with the voltage of 3.5 V output from the third power supply unit 13. Then, at a time point of t6, at which a short period of time has elapsed since the time point of t5, the calculation unit 14 reads an output signal of the rotation sensor unit 16a.

An interval between the time point of t5 and the time point of t6 is a period of time required for a wait until the power supply of 3.5 V becomes stable, and thus the interval can be set to a relatively short period of time. In FIG. 3, as described later, there is exemplified a case in which detection information indicating rotation has failed to be acquired from the rotation sensor unit 16a at the time point of t6 and a time point of t9, and detection information indicating rotation has successfully been acquired at a time point of t12.

The calculation unit 14 has failed to acquire detection information indicating rotation at the time point of t6, and thus temporarily stops power supply at a time point of t7. Then, after a while, similarly to the time point t5 to the time point t7, the calculation unit 14 performs a series of operations, that is, supplying power at t8, reading detection information at t9, and cutting off power supply at t10.

When the calculation unit 14 has successfully acquired detection information indicating rotation as a result of supplying power again at a time point of t11 and reading detection information at a time point of t12, the calculation unit 14 does not cut off power supply at a time point of t13 and continues to supply power for a while. Then, the calculation unit 14 acquires detection information again at a time point of t14 while supplying power.

When the calculation unit 14 has failed to acquire detection information indicating rotation at the time point of t14, the calculation unit 14 temporarily cuts off power supply, and supplies power again at a time point of t15 at an interval shorter than the previous interval. When the calculation unit 14 has successfully acquired detection information indicating rotation also at the time point of t14, the calculation unit 14 continuously supplies power and interrupts intermittent supply.

After the calculation unit 14 has supplied power again at the time point of t15, the calculation unit 14 reads detection information at a time point of t16. Then, when the calculation unit 14 has failed to acquire detection information indicating rotation also at the time point of t16, the calculation unit 14 reads detection information again at a time point of t17. When the calculation unit 14 has failed to acquire detection information indicating rotation even through two times of reading, the calculation unit 14 operates so as to return the interval to a longer interval having an original length as shown at the time points of t5, t8, and t11, supply power intermittently, and sample detection information. When the calculation unit 14 has successfully acquired detection information indicating rotation, the calculation unit 14 stores the information into the memory.

As described above, in the second embodiment, the CPU is supplied with power immediately after the ignition switch is set off. As a result, after the ignition switch is set off, the third power supply unit, the calculation unit, and the rotation sensor unit can be activated so as to perform an operation at the time when the ignition switch is off based on determination by the CPU.

Further, after the CPU has confirmed completion of its activation, the CPU stops its operation and causes the calculation unit 14 to take over subsequent control. As a result, similarly to the first embodiment described above, it is possible to implement the rotation detection device capable of reducing current consumption required for detecting rotation information as much as possible while at the same time detecting the rotation information even when the ignition switch is off.

Further, when the interval of operating the rotation sensor intermittently can be changed to be shortened, rotation can be detected quickly at a shorter interval compared to a case in which the interval can be changed to return to an original interval. As a result, it is possible to acquire detection information at an appropriate timing so as to prevent a failure to detect rotation.

Through adoption of such a configuration in the second embodiment, the rotation sensor unit itself can use the same circuit network to handle both of the case in which the ignition switch is on and the case in which the ignition switch is off. As a result, two types of circuits are not required to be used as the rotation sensor unit individually for the case in which the ignition switch is on and the case in which the ignition switch is off, and an advantage of simplifying the circuit network can be obtained.

When the interval of intermittent operation can be changed, the interval may be changed to a short interval or conversely to a long interval in accordance with change in detection signal, for example, an acceleration.

Further, the rotation detection device according to the second embodiment is configured to store, into the memory, information indicating rotation detected when the ignition switch is off. Thus, there can be provided a configuration in which the circuit detection circuit is supplied with power in a concentrated manner when the ignition switch is off, and a part of output by the circuit detection circuit is supplied to the rotation sensor unit. Therefore, compared with a configuration in which power is supplied to both of the calculation unit and the sensor unit independently when the ignition switch is off, the circuit configuration can be simplified, and the size of the device, in particular, the size of the sensor unit, can be reduced.

Third Embodiment

The configuration of a rotation detection device according to a third embodiment of the present invention is similar to those of the first embodiment and the second embodiment. That is, the calculation unit 14 performs a substantial operation when the ignition switch 3 is off. The calculation unit 14 in the third embodiment is different from the calculation units 14 in the first and second embodiments in that the calculation unit 14 has a function of being able to calculate and store the rotation angle in parallel with the CPU 15 even when the ignition switch 3 is on.

In view of the above, the rotation detection device according to the third embodiment can use this function to compare the rotation angle calculated by the CPU 15 with the rotation angle calculated by the calculation unit 14 when the ignition switch 3 is on, and determine whether the calculation unit 14 and the CPU 15 are normal or abnormal based on whether those rotation angles match each other. In general, the CPU 15 has better calculation speed and accuracy than the calculation unit 14. Thus, the calculation unit 14 and the CPU 15 are required to determine whether the calculation unit 14 and the CPU 15 are normal or abnormal by ensuring a certain degree of margin for the difference between both rotation angles.

For example, it is assumed that, compared with the CPU 15, the interval of inputting detection information by the rotation sensor unit 16 is twice and the calculation unit 14 has a slower speed. In this case, the resolution of the calculation unit 14 is about half a resolution of the CPU 15. Thus, when the result of calculation by the calculation unit 14 and the result of calculation by the CPU 15 are compared with each other, it is required to ensure a margin that depends on the difference between both resolutions.

The calculation unit 14 transfers the calculated rotation information to the CPU 15. The CPU 15 compares the rotation information acquired from the calculation unit 14 with the rotation information calculated by itself, and when both pieces of rotation information match each other in consideration of the margin, the CPU 15 determines that both pieces of rotation information are normal.

When the CPU 15 determines that both pieces of rotation information do not match each other, the CPU 15 calculates an estimation value of the rotation information in consideration of the control amount calculated and output by itself. Then, the CPU 15 compares the estimation value with each of the pieces of rotation information calculated by the CPU 15 and the calculation unit 14, and determines which one of the pieces of rotation information is more appropriate.

In this determination, rotation information closer to the estimation value may not always be determined to be more appropriate. For example, even in a case where one of the pieces of rotation information is closer to the estimation value in terms of the absolute value, when the rotation directions are different from each other and the other one of the pieces of rotation information has the same rotation direction as that of the estimation value, the other one of the pieces of rotation information may be determined to be more appropriate. Thus, the CPU 15 identifies more appropriate rotation information by considering the rotation direction as well as the deviation from the estimation value.

When the CPU 15 determines that the rotation information calculated by the CPU 15 is normal, the CPU 15 can continue the control. On the contrary, when the CPU 15 determines that the rotation information calculated by the calculation unit 14 is more appropriate than the rotation information calculated by the CPU 15, the CPU 15 can continue control based on the rotation information calculated by the calculation unit 14.

The resolution of rotation information calculated by the calculation unit 14 is inferior to the resolution of rotation information calculated by the CPU 15, and thus the CPU 15 is required to perform correction in consideration of the difference in resolution when calculating the control amount. Control can be continued irrespective of which one of the pieces of rotation information is to be adopted, and it is possible to continue to drive the vehicle for a while.

As described above, in the third embodiment, there is provided the configuration of comparing the result of calculating rotation information by the CPU and the result of calculating rotation information by the calculation unit inside the rotation detection circuit when the ignition switch is on. As a result, it is possible to determine validity of the result of calculating rotation information by the CPU when the ignition switch is on. Further, even in a case where the result of calculating rotation information by the CPU is not valid, when the result of calculating rotation information by the calculation unit is valid, the rotation information calculated by the calculation unit can be used to continue control.

Fourth Embodiment

Figure 4:
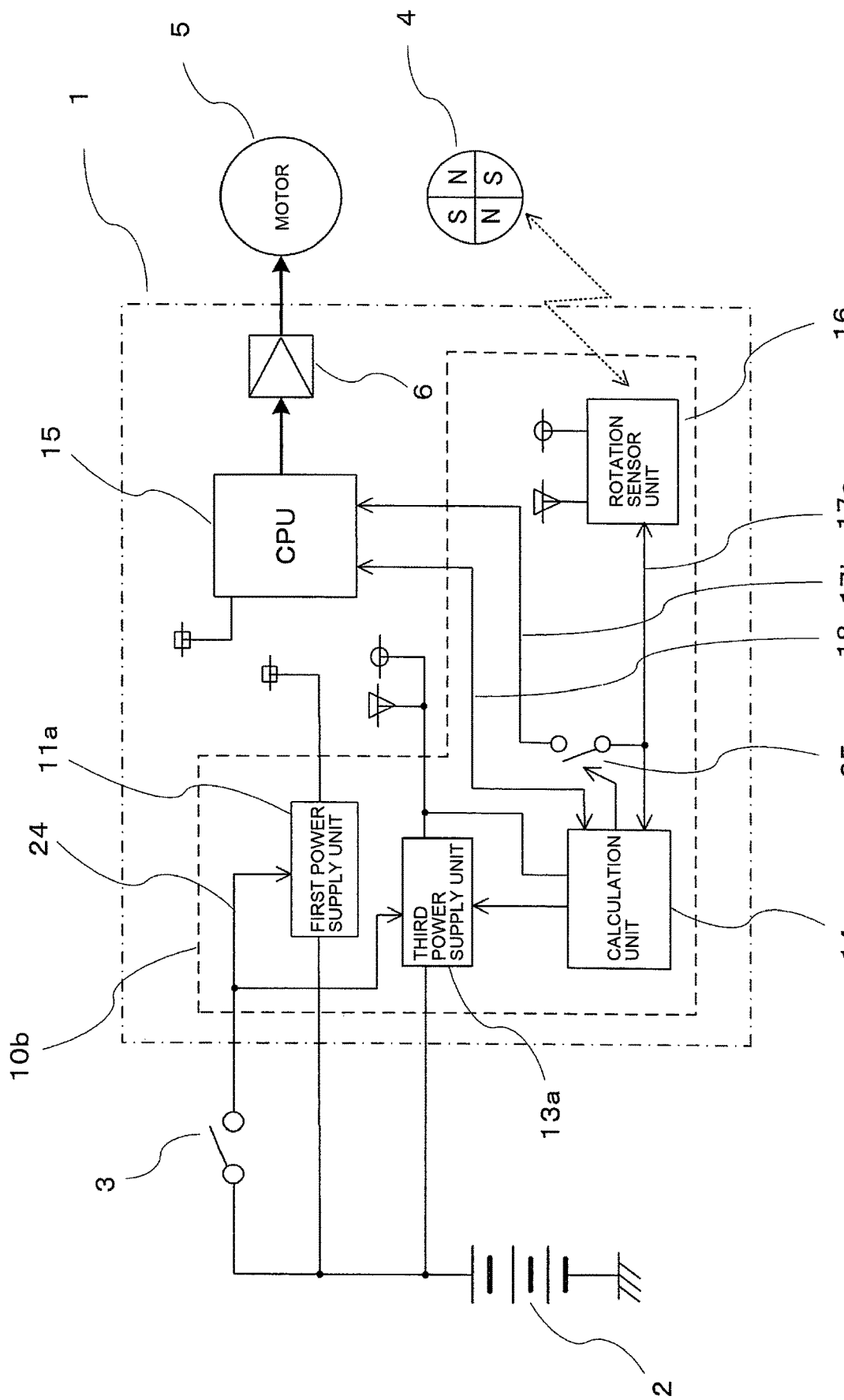
FIG. 4 is a circuit diagram for illustrating an entire system including a rotation detection device according to a fourth embodiment of the present invention.

FIG. 4 is a circuit diagram for illustrating an entire system including a rotation detection device according to a fourth embodiment of the present invention. Components equivalent to those of FIG. 1 of the first embodiment are denoted by the same reference symbols.

A rotation detection circuit 10b in the fourth embodiment includes two types of power supply units, namely, the first power supply unit 11a and the third power supply unit 13a. The first power supply unit 11a is directly supplied with a current from the battery 2. Further, the first power supply unit 11a reads an on/off state of the ignition switch 3 via a line 24. Further, the first power supply unit 11a is configured not to be activated when the ignition switch 3 is not set on. This first power supply unit 11a is a power supply configured to supply power of 5 V to the CPU 15.

Meanwhile, the third power supply unit 13a is directly supplied with a current from the battery 2. Further, the third power supply unit 13a reads the on/off state of the ignition switch 3 via the line 24. Then, the third power supply unit 13a outputs 5 V as the constant power supply for the rotation sensor unit 16 when the ignition switch 3 is on. Alternatively, the third power supply unit 13a outputs 3.5 V as the constant power supply for the rotation sensor unit 16 when the ignition switch 3 is not set on.

That is, the third power supply unit 13a is configured to switch the output voltage in accordance with the on/off state of the ignition switch 3. This switching is not limited to components that directly depend on the ignition switch 3, and the calculation unit 14a may determine the state of the ignition switch 3 and switch the output voltage. With the latter method of switching by the calculation unit 14a, the output voltage can be switched in consideration of an appropriate delay for an on/off operation of the ignition switch 3.

Further, the calculation unit 14a is connected to the rotation sensor unit 16 via the communication line 17a. Meanwhile, a shut-off unit 25, which can be switched by the calculation unit 14a, is inserted into a communication line 17b configured to connect the calculation unit 14a to the CPU 15. With such a configuration, it is possible to prevent a redundant signal from flowing to the CPU 15 by shutting off the communication line 17b with the shut-off unit 25 when the ignition switch 3 is off. Meanwhile, the shut-off unit 25 is switched to the on state to connect the communication line 17b only when the ignition switch 3 is on.

As described above, in the fourth embodiment, there is provided the configuration of enabling control of switching the output of the constant power supply in accordance with the state of the ignition switch. As a result, there is provided an effect of achieving simplification of the circuit network of the rotation detection circuit and reducing the size and cost of the circuit network.

Further, the output of the constant power supply of the third power supply unit 13a is supplied to the CPU 15 as the reference voltage when the ignition switch 3 is on, to thereby enable the CPU 15 to suppress the detection error with respect to the calculation unit 14a.

The constant power supply of the third power supply unit 13a may be one power supply of 3.5 V. In that case, the constant power supply of 3.5 V is required to be supplied to the CPU 15 as the reference voltage when the ignition switch 3 is on. With this, the CPU 15 can suppress the detection error with respect to the calculation unit 14a.

Fifth Embodiment

Figure 5:
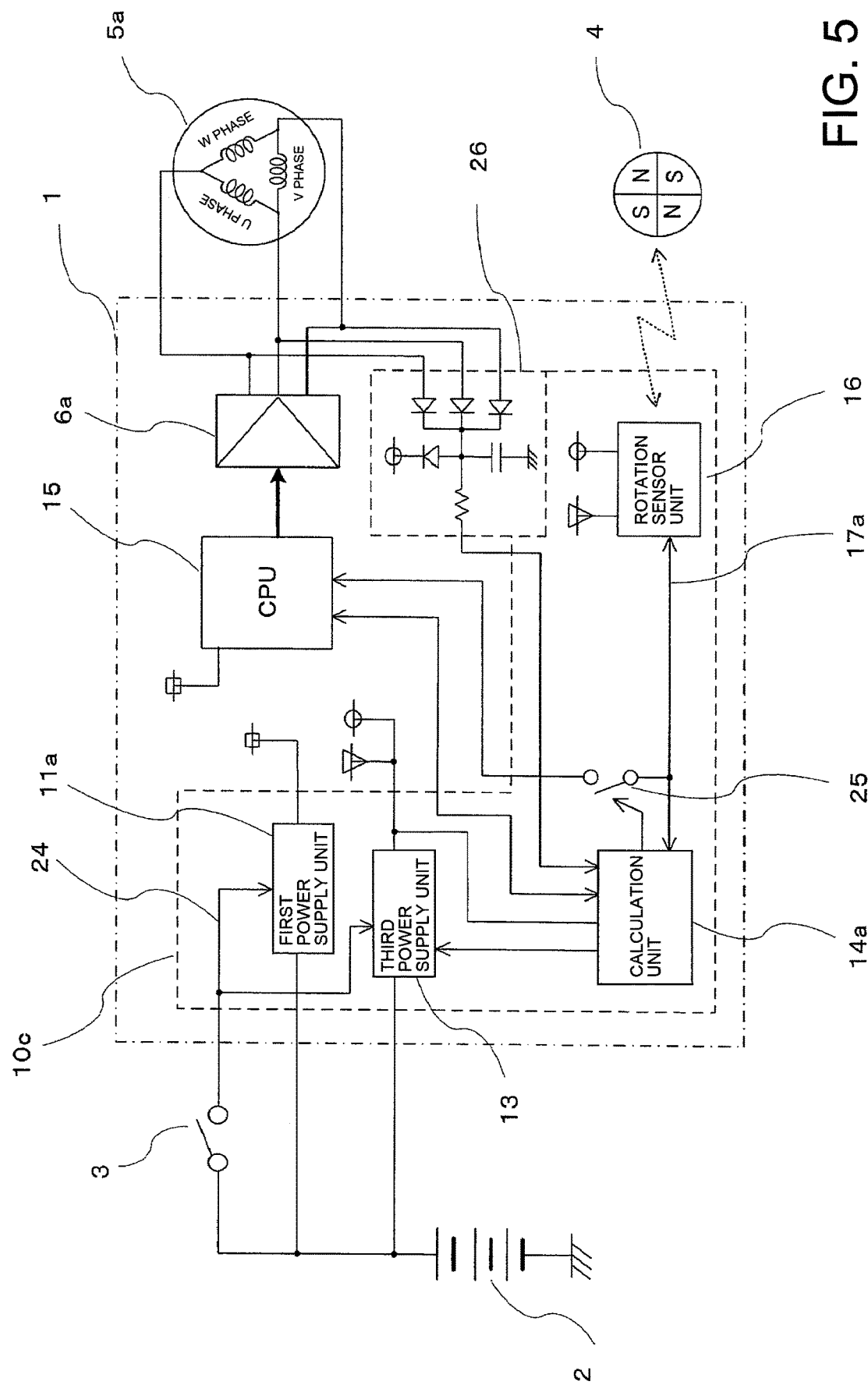
FIG. 5 is a circuit diagram for illustrating an entire system including a rotation detection device according to a fifth embodiment of the present invention.

FIG. 5 is a circuit diagram for illustrating an entire system including a rotation detection device according to a fifth embodiment of the present invention. Components equivalent to those of FIG. 4 of the fourth embodiment are denoted by the same reference symbols.

A motor 5a in the fifth embodiment is a three-phase winding motor. Thus, a drive circuit 6a also supplies power to the motor 5a via output lines corresponding to three phases. In the fifth embodiment, a monitor circuit 26 configured to monitor the voltages of the output lines corresponding to three phases is added.

The monitor circuit 26 integrates the voltages generated in the output lines into one voltage by a wired OR, and transmits the voltage to the calculation unit 14a. The monitor circuit 26 monitors each terminal voltage of the motor 5. When the ignition switch 3 is off and the motor 5 is rotated forcibly, an induced voltage is generated in a winding. Then, the generated induced voltage is input to the calculation unit 14a via the monitor circuit 26 when the generated induced voltage is equal to or larger than a value set in advance.

The monitor circuit 26 is included, to thereby enable the calculation unit 14a to change the intermittent interval to be a long period of time, and reduce the dark current. Further, the monitor circuit 26 is included, to thereby enable rotation of the motor to be monitored at all times through the induced voltage, and prevent a failure to detect rotation.

When the monitor circuit 26 monitors the induced voltage of the motor and a voltage of a set level or more is generated, the voltage generated as the induced voltage is input to the calculation unit 14a. Through input of this generated voltage into the calculation unit 14a, the calculation unit 14a can immediately supply power when the ignition switch 3 is off. That is, the monitor circuit 26 detects the induced voltage so as to cause the calculation unit 14a to wake up.

After the calculation unit 14a supplies power by the monitor circuit 26, the calculation unit 14a can continue to supply power continuously for a while. Further, when the calculation unit 14a fails to acquire detection information indicating rotation during continuous power supply, the calculation unit 14a can also interrupt power supply to stop intermittent supply.

Further, the third power supply unit 13 can also be configured to output the same voltage irrespective of whether the ignition switch 3 is on or off. Even when the configuration of outputting the same power supply is adopted, it is possible to reduce current consumption by supplying power intermittently when the ignition switch is off.

As described above, in the fifth embodiment, there is provided the configuration of detecting an induced voltage generated when the motor is rotated forcibly, to thereby wake up the calculation unit. As a result, it is possible to change the intermittent interval to be a long period of time, to thereby reliably prevent a failure to detect rotation while at the same time reducing the dark current.

Sixth Embodiment

Figure 6:
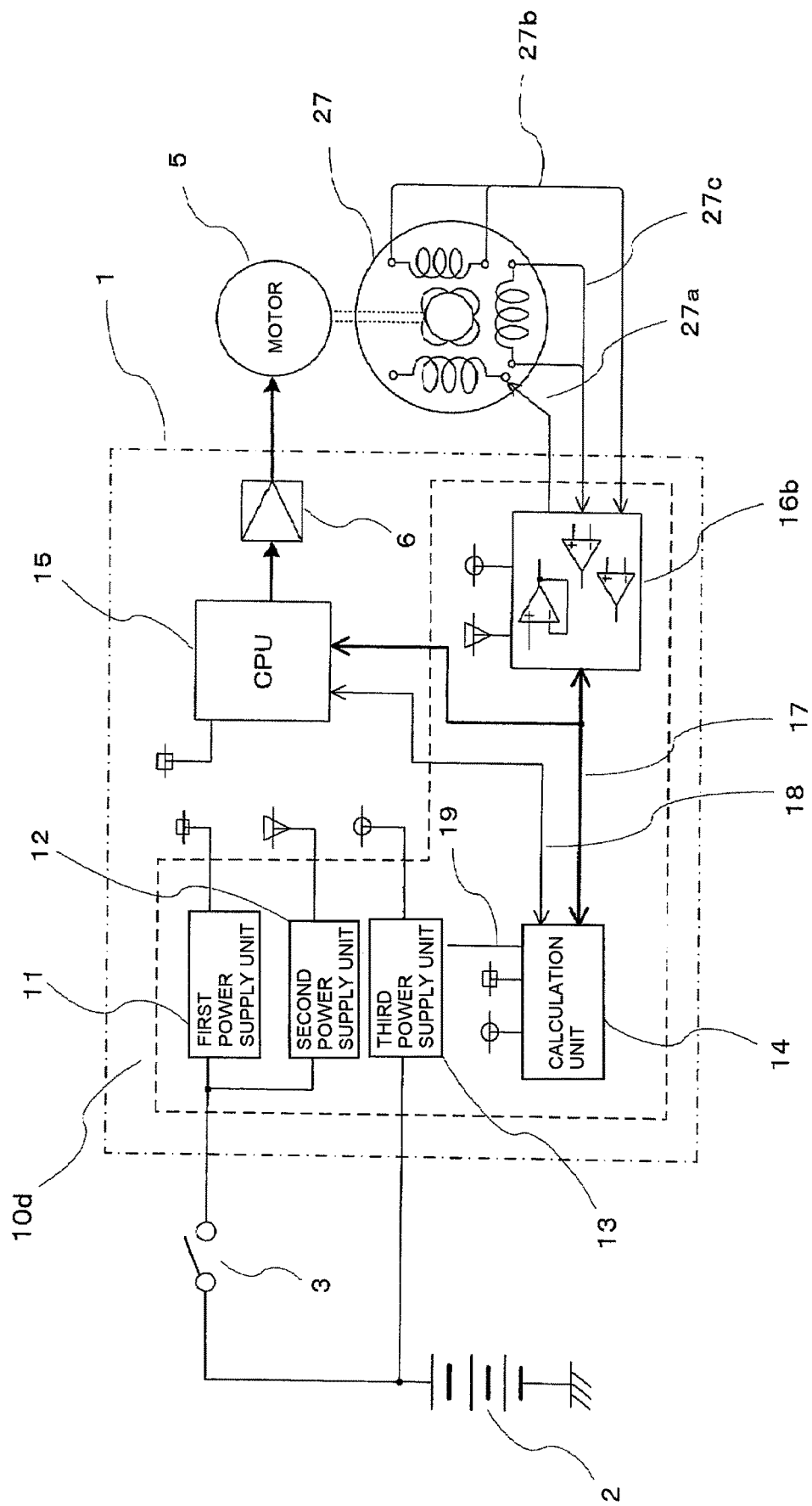
FIG. 6 is a circuit diagram for illustrating an entire system including a rotation detection device according to a sixth embodiment of the present invention.

FIG. 6 is a circuit diagram for illustrating an entire system including a rotation detection device according to a sixth embodiment of the present invention. Components equivalent to those of FIG. 1 of the first embodiment are denoted by the same reference symbols. FIG. 6 is different from the configuration of FIG. 1 in that the rotation sensor is a resolver 27. A rotation sensor unit 16b being a resolver outputs an excitation signal 27a, and receives input of a sine signal 27b and a cosine signal 27c. Then, the calculation unit 14 calculates the angle of the motor 5 based on the sine signal 27b and the cosine signal 27c.

Thus, the rotation sensor unit 16b configured to output and input each signal is connected to the calculation unit 14. Similarly to the first to fifth embodiments, the rotation sensor unit 16b outputs the excitation signal 27a by the power supply of 5 V when the ignition switch 3 is on. On the contrary, the rotation sensor unit 16b outputs the excitation signal 27a by the power supply of 3.5 V when the ignition switch 3 is off.

When the sine signal 27b and the cosine signal 27c being detection signals are checked, the calculation unit 14 performs monitoring at both timings of a peak and a valley of an excitation signal 26a when the ignition switch 3 is on. On the contrary, when the ignition switch 3 is off, the calculation unit 14 performs monitoring at only the timing of a peak of the excitation signal 27a or only the timing of a valley of the excitation signal 27a. Further, when the ignition switch 3 is off, the calculation unit 14 can also perform monitoring by skipping one peak.

As described above, in the sixth embodiment, there is provided the configuration of changing not only the power supply voltage but also the monitoring interval, namely, the resolution, in accordance with the state of the ignition switch 3, and monitoring rotation of the motor. As a result, it is therefore possible to implement the rotation detection device capable of further reducing current consumption required for detecting rotation information while at the same time detecting the rotation information even when the ignition switch is off.

The second power supply unit 12 and the third power supply unit 13 may output the same voltage. However, if possible, it is desired to provide the configuration of setting a difference for the supplied current depending on whether the ignition switch 3 is on or off, and supplying a larger amount of current when the ignition switch 3 is on than when the ignition switch 3 is off.

Further, the rotation sensor is not limited to a magnetic sensor, and even when the rotation sensor is a resolver of an AC generator, the rotation sensor can suppress current consumption in a similar manner. Further, in each of the embodiments described above, the power supply voltage is changed in accordance with the situation of the ignition switch. However, the present invention is not limited to such a configuration. The configuration may be to perform detection at a low power supply voltage irrespective of the situation of the ignition switch. In this case, the current consumption is suppressed by change in resolution due to intermittent detection.

REFERENCE SIGNS LIST 1 control unit, 2 battery, 3 ignition switch, 4 rotor, 5, 5a motor, 6, 6a drive circuit, 10, 10a, 10b, 10c, 10d, rotation detection circuit, 11, 12, 13 power supply unit, 14, 14a calculation unit, 15 CPU, 16, 16a, 16b rotation sensor unit, 20 selector, 26 monitor circuit, 27 resolver

The invention claimed is:

1. A rotation detection device, comprising:
an on-time power supply connected to a battery mounted on a vehicle and to an ignition switch, and is configured to generate a first constant voltage when the ignition switch is on;
an off-time power supply connected to the battery and configured to generate a second constant voltage lower than the first constant voltage, when the ignition switch is off;
a rotation sensor configured to output a detection signal corresponding to rotation information that depends on a rotation operation of the vehicle;
a controller configured to calculate on-time rotation information on the vehicle when the ignition switch is on, by using the detection signal output from the rotation sensor that is generated based on the first constant voltage, to control a motor for the vehicle; and
a calculator connected to the off-time power supply and configured to:
control the off-time power supply to intermittently supply the second constant voltage to the rotation sensor when the ignition switch is off, at an intermittent interval;
calculate off-time rotation information on the vehicle by using the detection signal output from the rotation sensor that is generated based on the intermittently supplied second constant voltage;
store the off-time rotation information into a memory; and
transfer the off-time rotation information stored in the memory to the controller when the ignition switch is set on again,
wherein, in the controlling the off-time power supply to intermittently supply the second constant voltage to the rotation sensor when the ignition switch is off, the calculator is further configured to:
update a set value of the intermittent interval, at which the second constant voltage is to be supplied intermittently, so that the set value becomes smaller, when the off-time rotation information contains information indicating rotation of the motor, and
update the set value, so that the set value becomes larger, when the off-time rotation information on the vehicle does not contain the information indicating rotation of the motor.

2. The rotation detection device according to claim 1, wherein, when the ignition switch is off, the rotation sensor outputs the detection signal as a signal with a higher resolution, as the intermittent interval becomes smaller.

3. The rotation detection device according to claim 1, wherein the rotation sensor is configured to output the detection signal as a signal with a higher resolution, as a value of the second constant voltage becomes larger.

4. The rotation detection device according to claim 1,
wherein the motor for the vehicle includes a motor having phase windings,
wherein the rotation detection device further comprises a monitor circuit configured to detect a state in which a voltage of each of winding terminals of the motor for the vehicle exceeds an allowable voltage value set in advance, and wherein the calculator is configured to start an operation of intermittently supplying the second constant voltage to the rotation sensor when the monitor circuit has detected the state in which the allowable voltage value is exceeded.

5. The rotation detection device according to claim 1, wherein the calculator is configured to generate rotation information for comparison by intermittently using a detection signal output from the rotation sensor when the ignition switch is on, and sequentially transfer the rotation information for comparison to the controller, and wherein the controller is configured to:

compare the on-time rotation information on the vehicle generated by the controller with the rotation information for comparison; and determine that the on-time rotation information on the vehicle has been generated normally when a difference between the on-time rotation information on the vehicle and the rotation information for comparison falls within an allowable range set in advance.

6. The rotation detection device according to claim 1, wherein the rotation sensor includes a single detection circuit in which a power supply voltage supplied from an outside is one system, wherein the rotation detection device further comprises a selector configured to select any one of the first constant voltage and the second constant voltage in accordance with an external command, and supply a selected power supply voltage to the rotation sensor, and wherein the calculator is configured to:

generate the external command so as to supply the first constant voltage to the rotation sensor when the ignition switch is on;

generate the external command so as to supply the second constant voltage to the rotation sensor when the ignition switch is off; and execute control of switching the selector.

7. The rotation detection device according to claim 1, wherein the on-time power supply is connected to the battery mounted via the ignition switch and configured to receive power from the battery when the ignition switch is on, and the off-time power supply is directly connected to the battery and configured to receive power from the battery when the ignition switch is on and when the ignition switch is off.

* * * * *